United States Patent [19]

Muller et al.

[11] Patent Number: 5,720,018

[45] Date of Patent: Feb. 17, 1998

[54] THREE-DIMENSIONAL REAL-TIME MONITORING OF ATTRIBUTES OF COMPUTER SOFTWARE PROCESSES

[75] Inventors: Hans Muller, Saratoga; Greg B. Nuyens, Menlo Park, both of Calif.; Qiang A. Zhao, Atlanta, Ga.; Nikhyl Singhal, Stanford, Calif.

[73] Assignee: Sun Microsystems, Inc., Mountain View, Calif.

[21] Appl. No.: 533,175

[22] Filed: Sep. 25, 1995

[51] Int. Cl.$^6$ ............................................. G06T 15/00
[52] U.S. Cl. ............................................. 395/133
[58] Field of Search ............................ 395/133, 118, 395/119, 125, 141, 326, 334, 335, 348, 965, 961, 966, 967, 969

[56] References Cited

U.S. PATENT DOCUMENTS

| | | | |
|---|---|---|---|
| 4,858,152 | 8/1989 | Estes | 395/966 X |
| 5,404,430 | 4/1995 | Tashiro et al. | 395/140 |
| 5,432,932 | 7/1995 | Chen et al. | 395/650 |
| 5,479,599 | 12/1995 | Rockwell et al. | 395/966 X |
| 5,555,354 | 9/1996 | Strasnick et al. | 395/140 X |

OTHER PUBLICATIONS

Hideki Koike, The Role of Another Spatial Dimension in Software Visualization, Jul. 11, 1993, ACM Transactions on Information Systems, vol. 11, No. 3, pp. 266–286.

Steketee, et al., Implementation of Process Migration in Amoeba, Proceedings of the 14th International Conference on Distributed Computing Systems, Jun. 21–24, 1994.

Topol, B., Stasko, J., and Sunderam, V., "Integrating Visualization Support into Distributed Computing Systems", Georgia Institute of Technology (GIT–GVU–94–38), Oct. 1994.

Shilling, J., and Stasko, J., "Using Animation to Design, Document and Trace Object Oriented Systems," Georgia Institute of Technology (GIT–GVU–92–12), Jun. 1992.

1994–95 Graphics Visualization & Usability Center, Project Abstracts, Georgia Institute of Technology.

*Primary Examiner*—Almis R. Jankus
*Attorney, Agent, or Firm*—Hickman Beyer & Weaver, LLP

[57] ABSTRACT

An improved technique for monitoring computer processes and their attributes using a three-dimensional graphical image. The three dimensional graphical image is formed by displaying the graphical objects associated with the computer processes and their attributes. The physical relationship between the various graphical objects within the graphical image preferably model the actual relationships between the processes and their attributes. The computers which run or activate the processes may also be represented by a graphical object within the graphical image. As the attributes of the computer processes change, the characteristics of the graphical objects are quickly adjusted and the three-dimensional graphical image is updated to reflect the changes to the attributes of the computer processes being monitored. By varying the characteristics of the graphical objects, a user is able to visually notice the changes that occur to the graphical objects of the three-dimensional graphical image as an indication of the changes taking place to the attributes of the processes being monitored.

31 Claims, 8 Drawing Sheets

THREE-DIMENSIONAL REAL-TIME MONITORING OF ATTRIBUTES OF COMPUTER SOFTWARE PROCESSES

BACKGROUND OF THE INVENTION

1. Field of the Invention

The present invention relates to the performance of computer programs, and more particularly, to monitoring attributes of computer processes.

2. Description of the Related Art

As computer programs for high performance computers, such as workstation computers, become more complicated, it becomes more difficult to monitor the performance of computer programs running on computers. Today, with object oriented programming, parallel programming, distributed computing and the like, monitoring the operations being performed on a computer becomes very complicated.

In some computers (e.g., UNIX based computers) computer programs invoke various processes, known as computer processes, to carry out the programming tasks. Hence, in order to monitor the performance of such computer programs, it is often necessary to monitor the processes being invoked by the computer program on the computer system. Conventionally, such computer processes have been examined to a limited extent using a displayed or printed list of the processes and a few attributes. Such a list might, for example, list whether or not the processes are active, the resident size of the process in memory, the state, the CPU usage, and the like. However, such lists or tables or other two-dimensional representations of the processes and their attributes are difficult for the user to understand. Moreover, as the complexity of computer programs increases, the difficulty with which such lists (or other two-dimensional views) can be understood also increases. Hence, one problem with the conventional techniques for monitoring processes of a computer system is that the data associated with the processes is not presented to a user in a fashion such that the user can readily understand the information and how it relates to other processes, particularly when the computer system includes a large number of processes and multiple computers.

Moreover, the conventional techniques for monitoring the processes of computer programs monitor the processes on a snap-shot basis. That is, the processes are monitored at a specific instance in time and then the information about the processes is relayed to the user in a list, table or other two-dimensional view. The problem with the conventional snap-shot technique is that the performance of the processes are not able to be accurately monitored because the is performance of the processes varies much faster than the frequency with which the snap-shots are taken.

Hence, both the presentation of the information about the processes and the frequency with which the monitoring occurs render conventional monitoring techniques unsatisfactory. Thus, there is a need for a process monitoring technique which closely approximates real-time and in which the information pertaining to the processes can be presented to a user in a manner in which the user quickly and readily understands the information.

SUMMARY OF THE INVENTION

Broadly speaking, the invention produces a three-dimensional graphical image for visual monitoring of computer processes of a computer system.

More particularly, the invention pertains to an improved technique for monitoring computer processes and their attributes using a three-dimensional graphical image. The three dimensional graphical image is formed by displaying the graphical objects associated with the computer processes and their attributes. The physical relationship between the various graphical objects within the graphical image preferably model the actual relationships between the processes and their attributes. The computers which run or activate the processes may also be represented by a graphical object within the graphical image. As the attributes of the computer processes change, the characteristics of the graphical objects are quickly adjusted and the three-dimensional graphical image is updated to reflect the changes to the attributes of the computer processes being monitored. By varying the characteristics of the graphical objects, a user is able to visually notice the changes that occur to the graphical objects of the three-dimensional graphical image as an indication of the changes taking place to the attributes of the processes being monitored.

The invention can be implemented numerous ways, including as a system, a method, or as a computer readable medium.

As a system for monitoring the performance of various computer processes associated with a computer network having at least a first and a second computer, with the first and second computers each being capable of having numerous computer processes concurrently active, an embodiment of the invention includes: a first monitoring process, located on the first computer having a first set of processes, for monitoring attributes of the first set of processes; a second monitoring process, located on the second computer having a second set of processes, for monitoring attributes of the second set of processes; and a visualizer process, capable of communicating with the first and second monitoring processes, for producing a three-dimensional graphical image including graphical objects representing the first and second sets of processes and the attributes of the first and second sets of processes. Preferably, at least one characteristic of one or more of the graphical objects within the graphical image changes when the corresponding attribute being monitored changes. The three-dimensional graphical image is also preferably updated in real-time to reflect changes in the attributes of the first and second sets of processes. It is further preferred that the three-dimensional graphical image produced by the visualizer process includes a visually distinct graphic object for at least a plurality of the attributes being monitored. The monitoring processes typically use one or more threads of execution or the like to implement the monitoring.

As a computer-implemented method for visualizing performance of processes of a computer system, an embodiment of the invention includes: providing a three-dimensional graphical model of the computer system having graphical objects for each of processes of the computer system that are to be monitored; displaying the three-dimensional graphical model on a display screen; monitoring attributes of the processes that are being monitored; and updating the three-dimensional graphical model on the display screen by altering characteristics of the graphical objects in accordance with the attributes monitored. Preferably, the graphical model further includes a graphical object for visually indicating a stall or block condition of a process.

As a computer-implemented method for monitoring computer processes within a computer system, an embodiment of the invention includes: providing graphical objects for the computer processes of the computer processes that are being monitored; obtaining data corresponding to the attributes of the computer processes that are being monitored; updating the graphical objects in accordance with the data obtained; and visually displaying the updated graphical objects as a three-dimensional graphical image of the computer processes and the attributes thereof that are being monitored. Optionally, the method may also enable a user to interact with the three-dimensional graphical image, via an input device, to select a first computer process of the computer processes being monitored and then move the first computer process from a first computer to a second computer, where the first and second computers are within the computer system.

As a computer program product, an embodiment of the invention includes a computer usable medium having computer readable code embodied therein for monitoring computer processes within a computer system. The computer readable code includes first computer readable program code devices configured to cause a computer to effect providing graphical objects for the computer processes and attributes of the computer processes that are being monitored; second computer readable program code devices configured to cause a computer to effect obtaining data corresponding to the attributes of the computer processes that are being monitored; third computer readable program code devices configured to cause a computer to effect updating the graphical objects in accordance with the data obtained; and fourth computer readable program code devices configured to cause a computer to effect visually displaying the updated graphical objects as a three-dimensional graphical image of the computer processes and the attributes thereof that are being monitored.

The three-dimensional graphical image produced by the invention facilitates not only the display of substantially more amounts of information about computer processes than previously obtainable, but also the display of such information in a most understandable and realistic way. With the visual representation of the computer processes and their attributes, the invention also improves the easy with which computer processes of a computer system can be monitored. In addition, load balancing can be effectuated graphically by a user (e.g., system administrator).

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
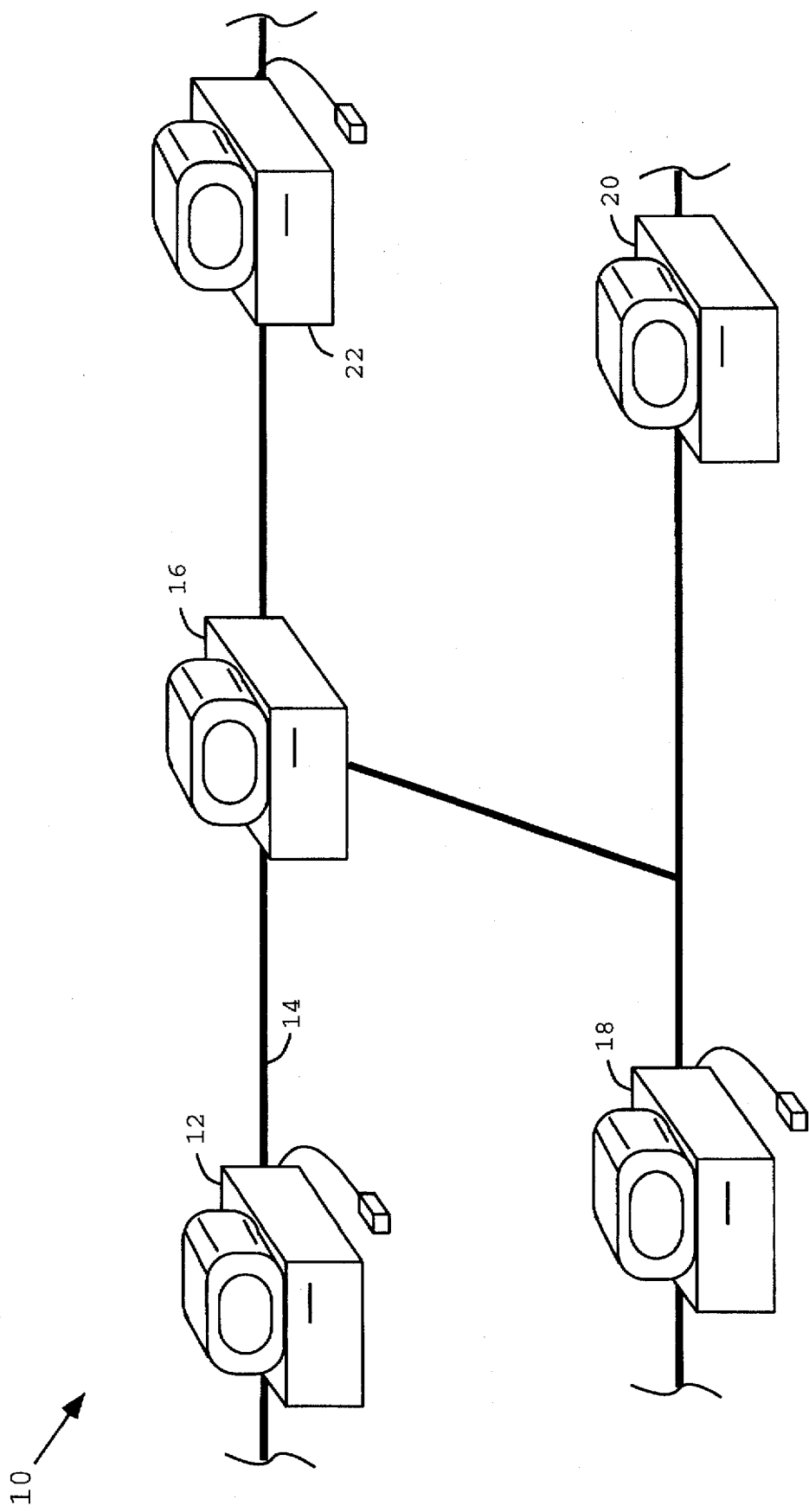
FIG. 1 is a block diagram of a representative network arrangement for use with the invention.

Embodiments of the invention are discussed below with reference to the drawings. However, those skilled in the art will readily appreciate that the detailed description given herein with respect to these figures is for explanatory purposes as the invention extends beyond these limited embodiments.

The invention relates to an improved technique for monitoring performance of computer processes. The improved technique uses a three-dimensional graphical image to represent the computer processes and their attributes. More particularly, graphical objects are built for the computer processes and their attributes. Examples of attributes, which can be monitored and then visually represented in a three-dimensional fashion for display to a user, include: process size, message is traffic rate, machine loads, number of objects within a process, resident process size, CPU usage and stalling (blockage). The three dimensional graphical image is formed by displaying the graphical objects on a display screen. The physical relationship between the various graphical objects within the graphical image preferably model the actual o relationships between the processes and their attributes. The computers which run or activate the processes may also be represented by a graphical object within the graphical image.

Thereafter, as the attributes of the computer processes change, the characteristics of the graphical objects are quickly adjusted and the three-dimensional graphical image is updated to reflect the changes to the attributes of the computer processes being monitored. By varying the characteristics of the graphical objects, the user is able to visually notice the changes that occur to the graphical objects of the three-dimensional graphical image as an indication of the changes taking place to the attributes of the processes being monitored. The characteristics of the graphical objects that can be varied include shape, scale, layout, light, texture, surface attributes, sound and behavior (animation). The use of such a three-dimensional graphical image also facilitates the display of substantially more amounts of information (e.g., attributes) on the computer processes in a most understandable way.

The definition of a few terms is provided next, followed by a discussion of a representative computer system suitable for use with the invention, and then followed by a detailed discussion of embodiments of the invention.

As used herein, the term "object" refers to an encapsulated package of code and data that can be manipulated by operations through a defined interface that is associated with an object. Thus, objects will be seen by those skilled in the art as including the basic properties that define traditional programming objects. However, "distributed objects" typically differ from traditional programming objects by the inclusion of two important features. First, distributed objects are multilingual. For example, the interfaces of distributed objects can be defined using an interface definition language that can be mapped to a variety of different programming languages. One such interface definition language is OMG's IDL. Second, distributed objects are typically location-independent, i.e., distributed objects can typically be located anywhere in a network. This contrasts sharply with traditional programming objects which typically exist in the same address space as the client. Distributed objects can be object clients or object servers, depending upon whether they are sending requests to other objects or replying to requests from other objects. Requests and replies are typically made through an Object Request Broker (ORB) that is aware of the locations and status of the objects.

A "distributed object system" or "distributed object operating environment" refers to a system comprising distributed objects that communicate through an ORB or the like.

A "client" as defined herein refers to an entity that sends a request to a second object. In this model, the second object is referred to as a "server object" or a "target object". Thus, clients invoke operations, or implementations, from servers. In a distributed object environment, clients typically need not have knowledge of the implementation programming language, nor does the implementation normally have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an IDL. As noted above, objects perform transactions through their interfaces. The use of interfaces therefore relieves the need of objects that are aware of the programming languages used to define the methods and data of the objects in the transaction.

The invention is preferably used in a distributed operating environment (DOE or NEO™) based on object oriented programming. Hence, distributed objects are contemplated. Typically, distributed objects are implemented (by the ORB and/or the host computer) under computer processes. Computer processes provide a well known and common framework under which computer systems implement different threads of execution. By way of analogy, a computer process can be thought of as a domain partitioned within a computer system.

In actuality, a process typically includes address space (i.e., a portion of memory allocated to only the process), a set of file descriptors, a process identification number, and one or more threads of execution (often referred to as threads). As is well known to those skilled in the art of object oriented programming, a thread of execution is essentially a sequential flow of the point of execution through a computer process. Multi-threaded systems allow for multiple threads to run concurrently in a single process. For a more detailed description of threads, multi-threaded processes, and principles of concurrency, please see "Concurrency Within DOE Object Implementations" by Dr. Robert Hagmann, Version 0.91, May 27, 1993, published by SunSoft and incorporated herein by reference in its entirety.

Usually, but not necessarily, distributed objects and computer processes in accordance with the present invention and other computer processes clients are resident on one or more computers linked together by a network. The network may take any suitable form. By way of example, a representative network arrangement 10 is illustrated in FIG. 1. The network arrangement 10 includes a first computer 12 which is coupled to a transmission line 14. The network arrangement 10 further includes a server, router or the like 16 in addition to other computers 18, 20, and 22 such that data and instructions can be passed among the networked computers. The design, construction and implementation of computer networks will be familiar to those of skill in the art.

Figure 2:
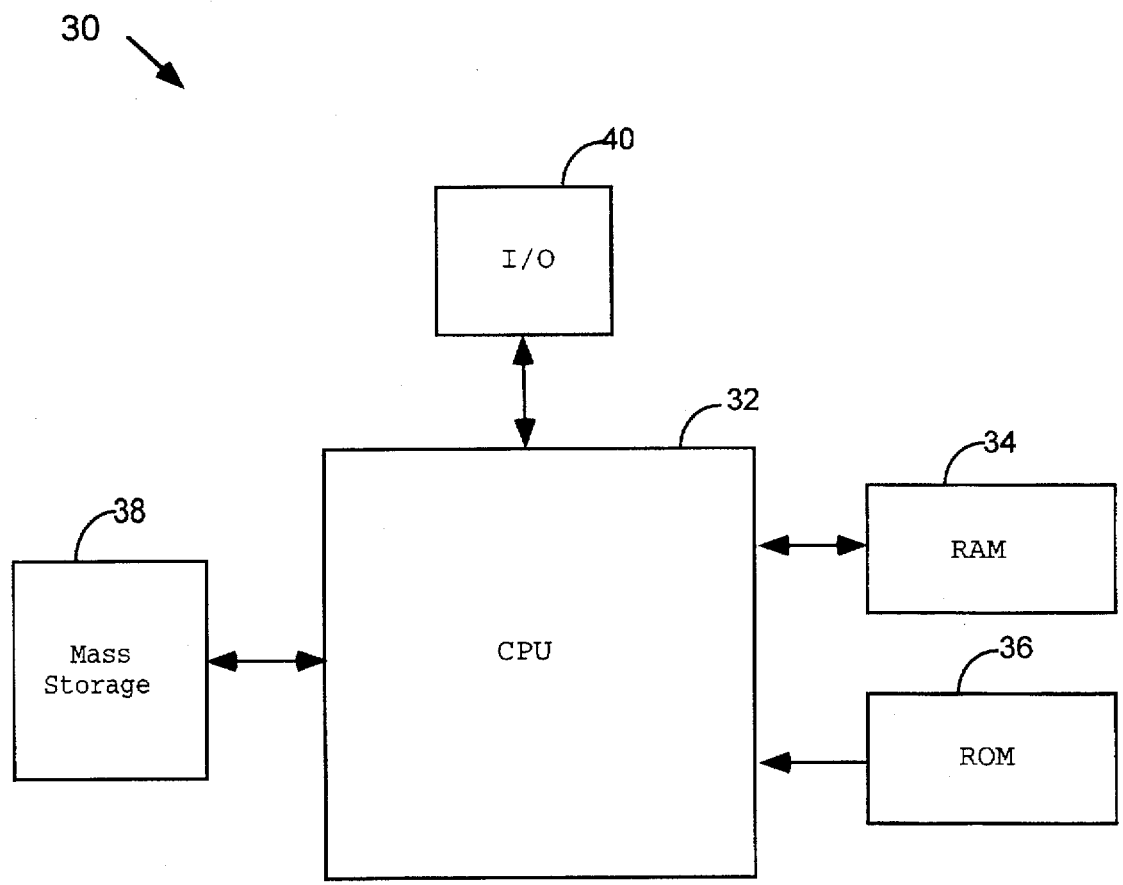
FIG. 2 is a block diagram of a representative computer suitable for use with the invention.

A representative computer 30 suitable for use as computers 12, 18, 20, and/or 22 of FIG. 1 is illustrated schematically in FIG. 2. The computer 30 includes a central processing unit (CPU) 32 which is coupled bidirectionally with random access memory (RAM) 34 and unidirectionally with read only memory (ROM) 36. Typically, the RAM 34 is used as a "scratch pad" memory and includes programming instructions and data, including distributed objects and their associated code and state, for processes currently operating on the CPU 32. The ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with the CPU 32. Mass storage device 38 generally includes additional programming instructions, data and objects that typically are not in active use by the CPU, although the address space may be accessed by the CPU 32, e.g., for virtual memory or the like. The computer 32 may optionally include an input/output source 40 that typically includes input media such as a keyboard, pointer devices (e.g., a mouse or stylus) and/or network connections. Additional mass storage devices (not shown) may also be connected to the CPU 32 through a network connection. It will be appreciated by those skilled in the art that the above described hardware and software elements, as well as the networking devices, are of standard design and construction, and will be familiar to those skilled in the art.

Figure 3:
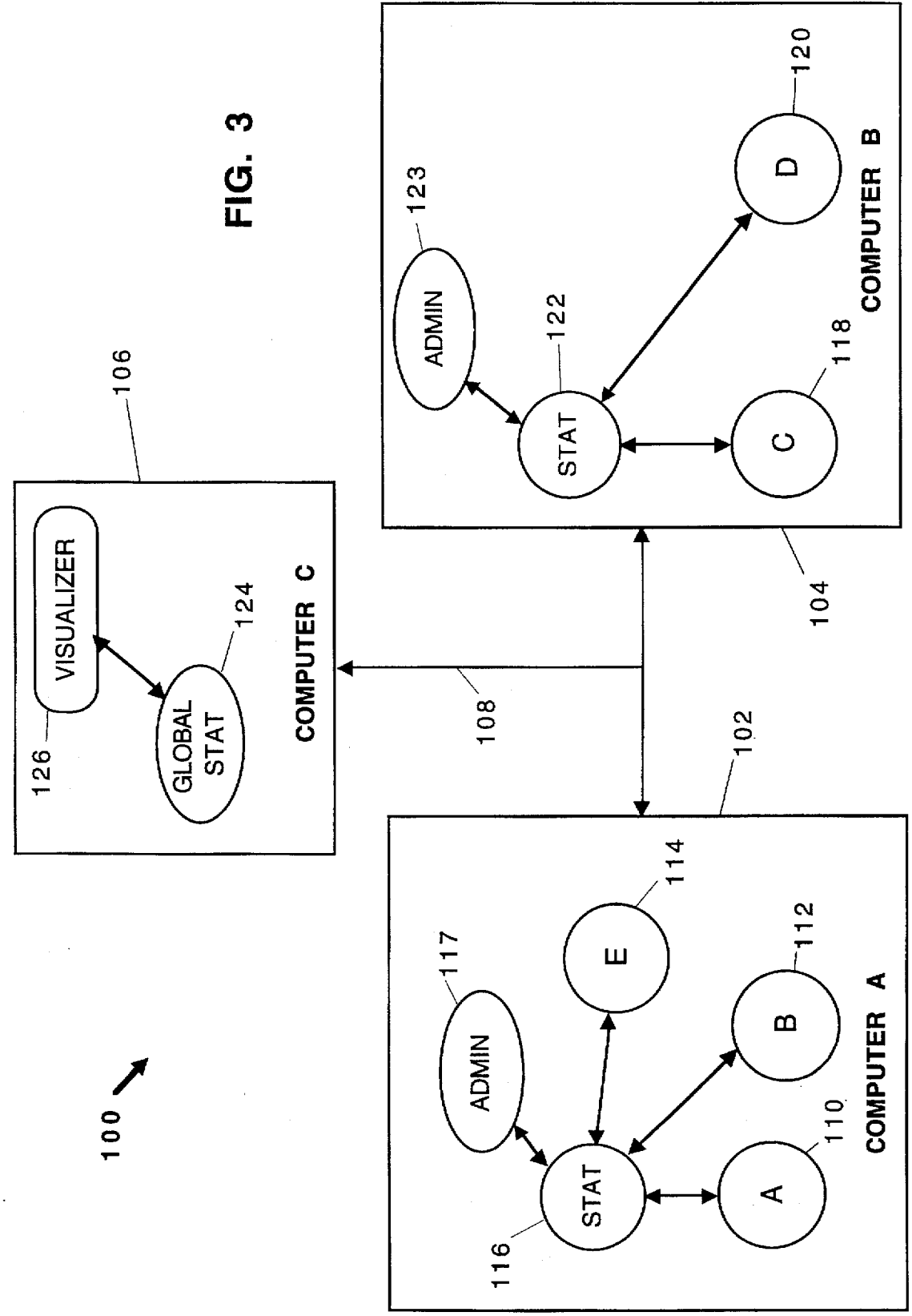
FIG. 3 is a block diagram of a process monitoring system for visualizing attributes of various processes in three dimensions in accordance with an embodiment of the invention.

FIG. 3 is a block diagram of a process monitoring system 100 for visualizing attributes of various processes in three dimensions in accordance with an embodiment of the invention. The process monitoring system 100 includes computer A 102, computer B 104, and computer C 106. Preferably, the computers 102, 104 and 106 are UNIX machines. For example, the computers 102, 104 and 106 may be workstation computers produced by Sun Microsystems, Inc. The computers 102, 104 and 106 are interconnected via a transmission media 108 so as to form a computer network. The computer network can be either a wired network such as a Local Area Network, or alternatively, a wireless network (e.g., radio or optical).

The computer A 102 includes process A 110, process B 112, and process E 114. The processes 110, 112 and 114 are computer processes which are active on the computer A 102. Such processes are well known in the art and include not only computer processes associated with application programs but also computer processes associated with operating systems. The processes 110, 112 and 114 each are connected to a statistics server process 116. The statistics server process 116 is a computer process that operates to gather statistics from the processes 110, 112 and 114 which are active on the computer A 102. These statistics pertain to attributes of the processes 110, 112 and 114. The statistics server process 116 is also preferably connected to an administrative process 117. The administrative process 117 manages the processes on the computer 102. For example, the administrative process 117 is a computer process utilized in the DOE system and functions to track all the server process that ORB knows about for the computer A 102. The administrative process 117 also facilitates a user starting up or shuting down processes, setting trace flags, and directing debugging output.

The computer B 104 includes process C 118 and process D 120. The processes 118 and 120 are computer processes which are active on the computer B 104. The processes 118 and 120 are each connected to a statistics server process 122. The statistics server process 122 is in turn connected to an administrative process 123. The statistics server process 122 operates in the same manner as does the statistics server process 116, and the administrative process 123 operates in the same manner as does the administrative process 117.

The third computer C 106 includes a global statistics server process 124 and a visualizer process 126. The visualizer process 126 and to the global statistics server process 124 interact to perform operations associated with the invention. The global statistics server process 124 is a computer process that gathers statistics by requesting that by the statistics server processes 116 and 122 respectively obtain statistics pertaining to the attributes of the processes residing on the computers 102 and 104. The statistics obtained from the statistics server processes 116 and 122 is more generally referred to as attribute data.

The visualizer process 126 is a computer process, actually a client process, that receives the attribute data for the various processes being monitored throughout the computer system and causes a three-dimensional graphical image to be displayed. The operation of the global statistics server process 124 is described in greater detail below with reference to FIG. 2, and the operation of the visualizer process 126 is described in greater detail below with reference to FIGS. 5–8.

Figure 4:
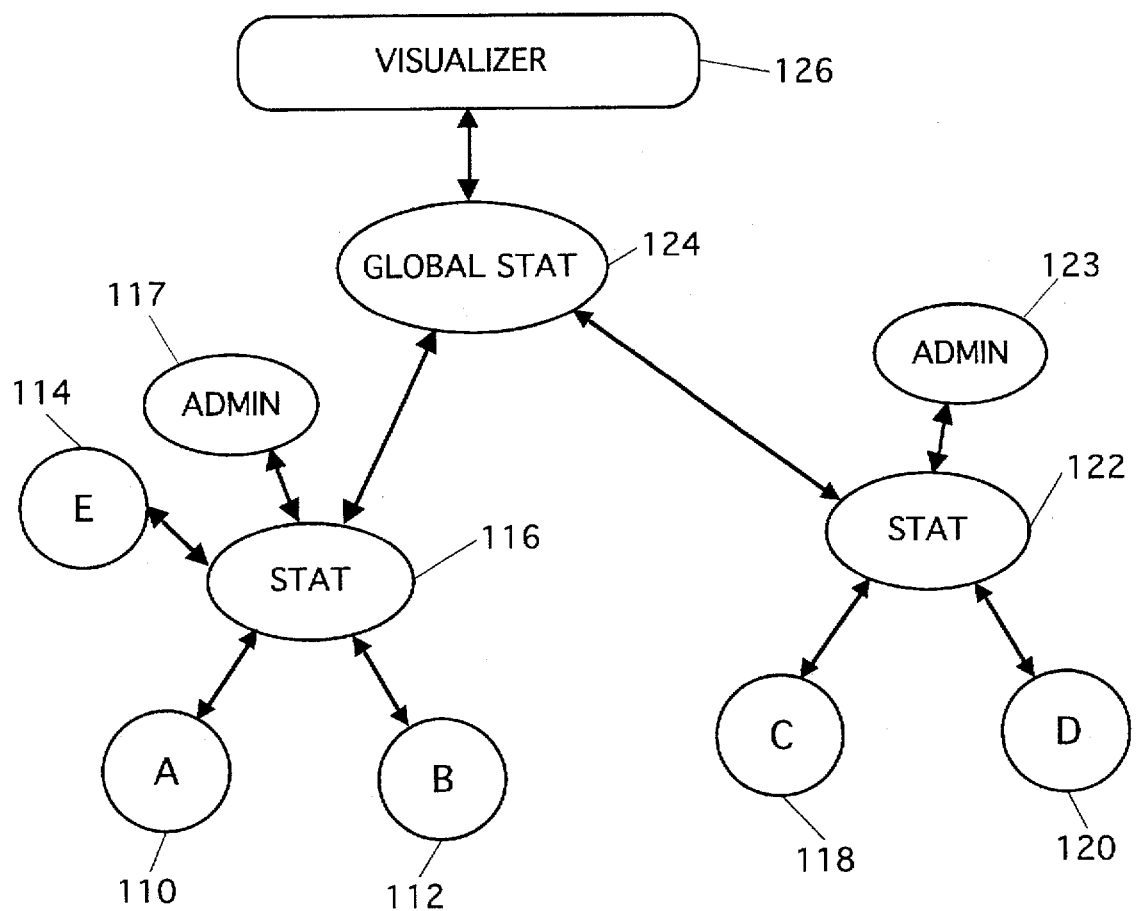
FIG. 4 is a schematic diagram of processes implementing the process monitoring system of FIG. 3.

FIG. 4 illustrates a schematic diagram of interaction amongst the various computer processes utilized by the process monitoring system 100 in accordance with an embodiment of the invention. In general, the visualizer process 126 is a client process which sends a data request to the global statistics server process 124. The data request sent to the global statistics server process 124 causes the global statistics server process 124 to in turn request attribute data from the processes which are active on the computers 102 and 104. In particular, the global statistics server process 124 invokes a thread of execution for each of the computers 102 and 104. A first thread of execution sends the request to the statistics server process 116 and listens for a reply. The statistics server process 116 then in turn requests available attribute data from the administrative process 117. A second thread of execution sends a request to the statistics server process 122 and listens for a reply. The statistics server process 122 then in turn requests available attribute data from the administrative process 123.

The global statistics server 124 is preferably an ORB statistics server which is a DOE server process that can reside on any machine and the computer system (i.e. workgroup). The ORB statistics server uses standard DOE calls to query the statistics process servers and to obtain statistics pertaining to the performance of the processes (e.g., attribute data). Since, the global statistics server 124 is preferably a DOE server, the DOE structure provides a framework for communicating between the different computers within the computer system (i.e., workgroup).

The administrative processes 117 and 123 contain information on how many processes there are active on the respective computer, as well as their process identifiers and names. The administrative processes 117 and 123 also track certain attributes of the active processes. For example, in the case where the administrative processes 117 and 123 are provided by the DOE system, they regularly track attributes such as process identifiers and number of active objects in a process. Further, using the process identifier obtained from the administrative processes 117 and 123, additional attributes can be obtained from the/proc file system. The/proc file system is part of the Solaris operating system produced by Sun Microsystems, Inc. The additional attributes found in the/proc file system for a process (indicated by a process identifier), include, for example: resident size, total size, number of messages sent and received, amount of CPU time, and amount of sleep time.

In addition to the attribute data available from the administrative processes 117 and 123, the statistics server process 116 may also request attribute data directly from the processes 110, 112 and 114, and the statistics server process 122 may also request attribute data directly from the processes 118 and 120. Although excessive direct requests to the processes are not preferable for performance reasons, direct requests can be useful to obtain attribute data from the processes which is not available indirectly (e.g., through the administrative process).

Figure 5:
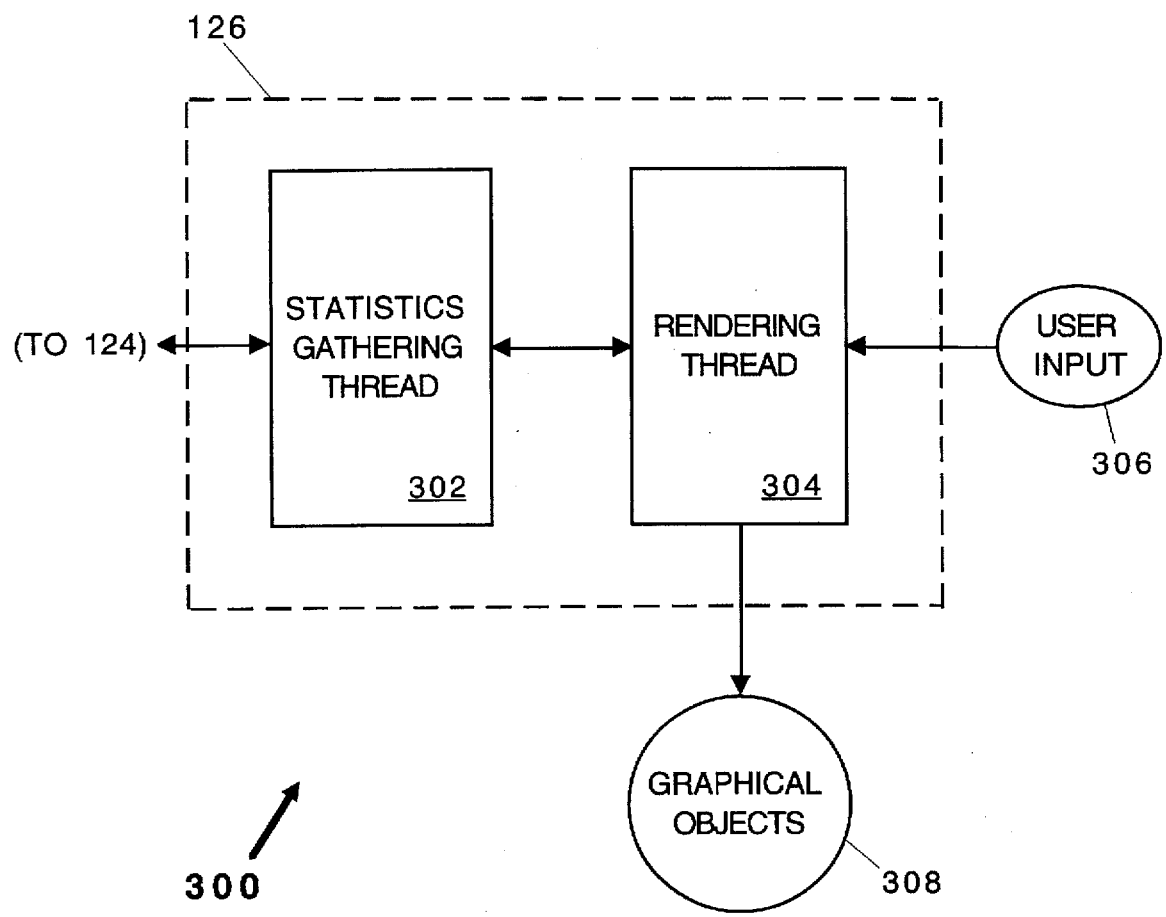
FIG. 5 is a block diagram of a visualizer process and related user inputs and graphical objects according to an embodiment of the invention.

FIG. 5 is a block diagram of the visualizer process 126 together with related user inputs and graphical outputs according to an embodiment of the invention. The visualizer process 126 includes two main threads of execution. The first thread is a statistics gathering thread 302 which interacts with the global statistics process 124 to obtain the necessary attribute data for the processes being monitored. The second thread of execution is a rendering thread 304. The rendering thread 304 receives user input 306 as well as attribute data from the statistic gathering thread 302. The rendering thread 304 causes graphical objects 308 to be drawn on a display screen of a computer system (preferably the computer C 106 on which the visualizer 126 is executing) so as to form a three-dimensional graphical image of the processes and their attributes which are active on a computer system. The rendering thread 304 also causes characteristics of the graphical objects 308 that form the three-dimensional view to be varied, altered, changed or otherwise updated such that attributes of the processes being monitored are displayed in a visually distinctive manner. The characteristics of the graphical objects 308 which can be varied, altered, changed or otherwise updated include, for example, height, width, color, translucence, shape, rotation, texture, movement and sound.

Figure 6:
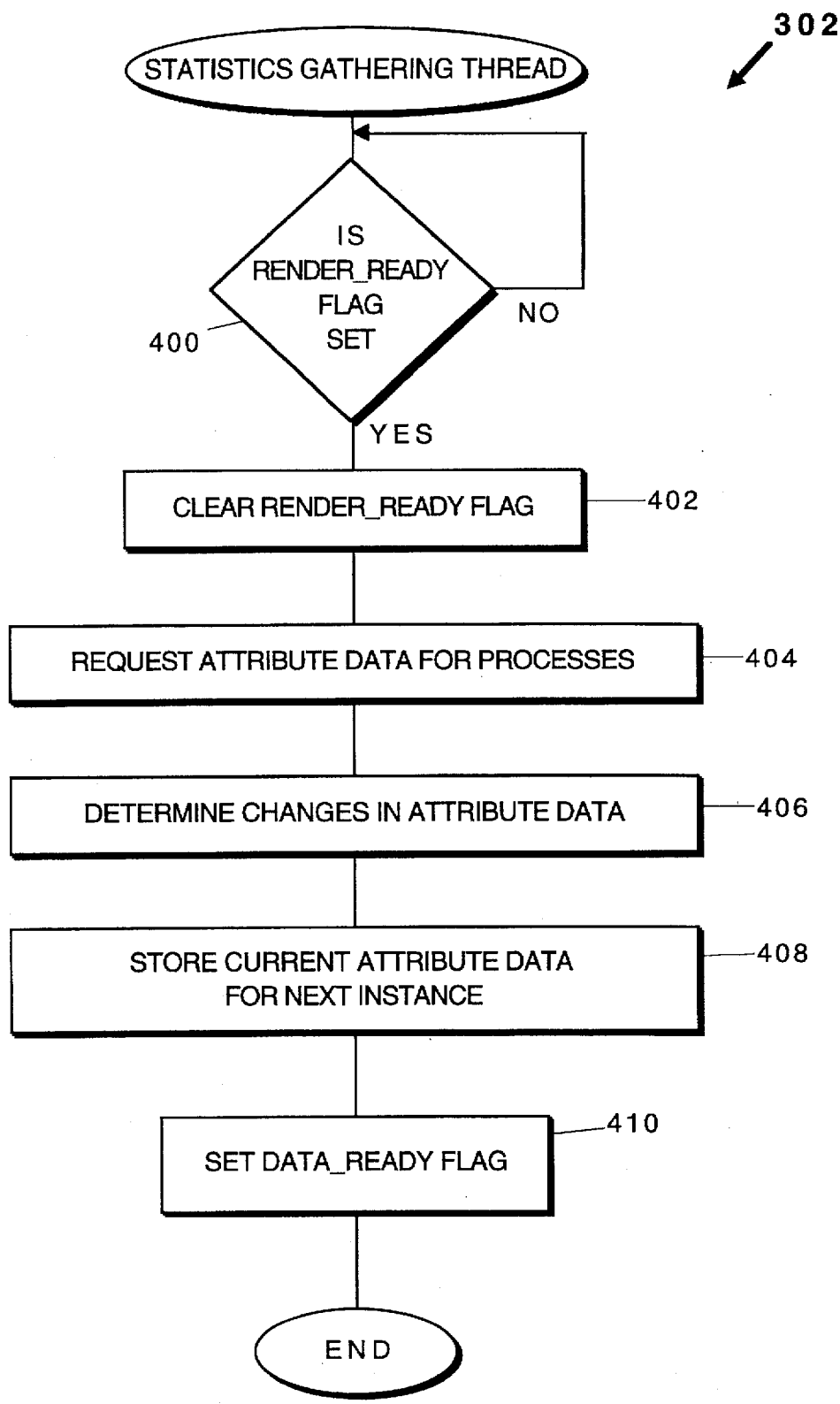
FIG. 6 is a flow chart of a statistics gathering thread in accordance with an embodiment of the invention.

FIG. 6 is a flow chart of the statistics gathering thread 302 of the visualizer 126 in accordance with an embodiment of the invention. The statistics gathering thread 302 begins with decision block 400 which determines whether a render_ready flag is set. Until the render_ready flag is set, the statistics gathering thread 302 simply waits until the render_ready flag becomes set. Once the render_ready flag is set, the statistics gathering thread 302 proceeds. Namely, the render_ready flag is cleared 402 and attribute data is requested 404 for each of the processes. At this point, the visualizer process 126 is requesting the attribute data for the processes to be monitored using the global statistics server process 124. The global statistics server process 124 then fans out the request to the statistics server process 116 and 122 which are local to the computers 102 and 104, respectively. Once the global statistics server process 124 returns with the attribute data which was available from each of the computers within the computer system. The statistics gathering thread 302 then determines 406 whether and by how much the attribute data has changed since the statistics gathering thread 302 was last invoked. When determining 406 the changes in the attribute data, the current attributes data provided by the global statistics server process 124 is compared against the previously obtained attribute data. Thereafter, the current attribute data is then stored 408 so that it is available for the next instance where it becomes previously obtained attribute data. Finally, the data_ready flag is set 410 so as to inform the rendering thread 304 that changes to the attribute data have been determined and that the three-dimensional graphical image can now be updated in accordance with the changes. Following block 410, the statistics gathering thread 302 is complete and ends.

Figure 7:
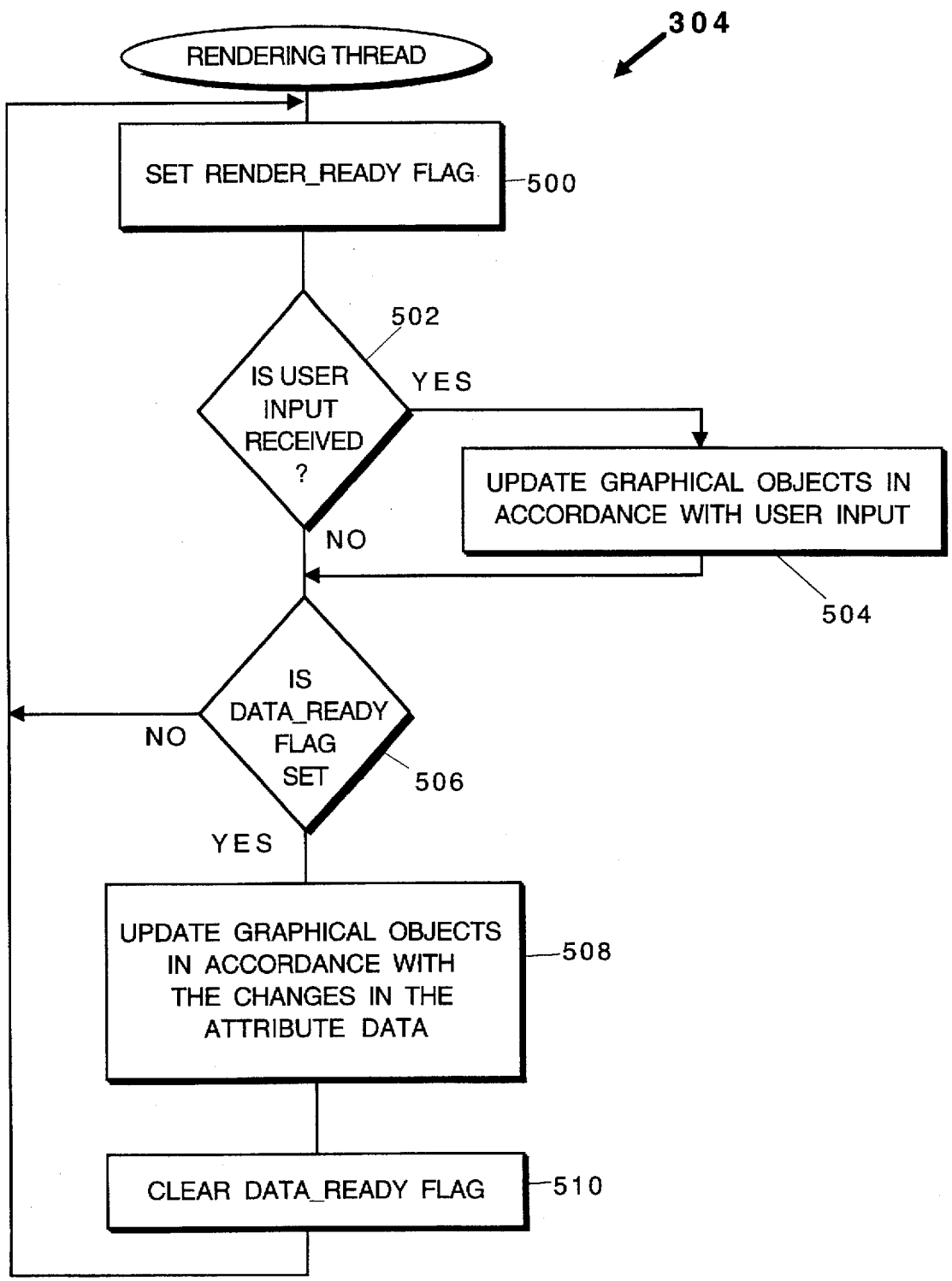
FIG. 7 is a flow chart of a rendering thread in accordance with an embodiment of the invention.

FIG. 7 is a flow chart of the rendering thread 304 of the visualizer process 126 in accordance with an embodiment of the invention. The rendering thread 304 begins by setting 500 the render_ready flag. By setting the render_ready flag, the rendering thread 304 is advising the statistics gathering thread 302 that it may obtain attribute data for the processes being monitored. The render_ready flag and the data_ready flag are semaphores used to control the concurrent operations between the statistics gathering thread 302 and rendering thread 304.

Following block 500, a decision 502 is made based on whether user input has been received. The user input, for example, includes mouse events and keyboards events. If a user input has been received, then the graphical objects 308 are updated 504 in accordance with the user input. As an example, the user can zoom in, zoom out, move left, move right, move up and move down with respect to the three-dimensional image. Such user actions cause the view, orientation or size of the three-dimensional graphical image to change. Other user actions with the three-dimensional graphical image are possible such as selection of a process and moving it from one computer to another computer for load balancing reasons. Load balancing is described in greater detail below.

Following block 504 or following the decision block 502 when no user input is received, a decision 506 is made based on whether the data_ready flag is set. Recall, the data_ready flag is set when the statistics gathering thread 302 has obtained attribute data for the various processes and determined where changes occur. If the data_ready flag is set, the decision block 506 causes the graphical objects 308 to be updated 508 in accordance with the changes in the attribute data. Here, the rendering thread 304 takes the information on the changes in the attribute data and supplies it to the graphical objects 308 so that the three-dimensional graphical image can be updated. The graphical objects 308 can, for example, be found in available graphical libraries. A representative graphical library having objects that represent three-dimensional shapes and supporting their rendering is RenderWare by Criterion Software, Ltd. of the United Kingdom. Appendix A contains an example of a model of graphical objects using RenderWare. The data_ready flag is then cleared 510. Following block 508 or following the decision block 506 when the data_ready flag is not set, the rendering thread 304 returns to repeat block 500 and subsequent blocks.

Figure 8:
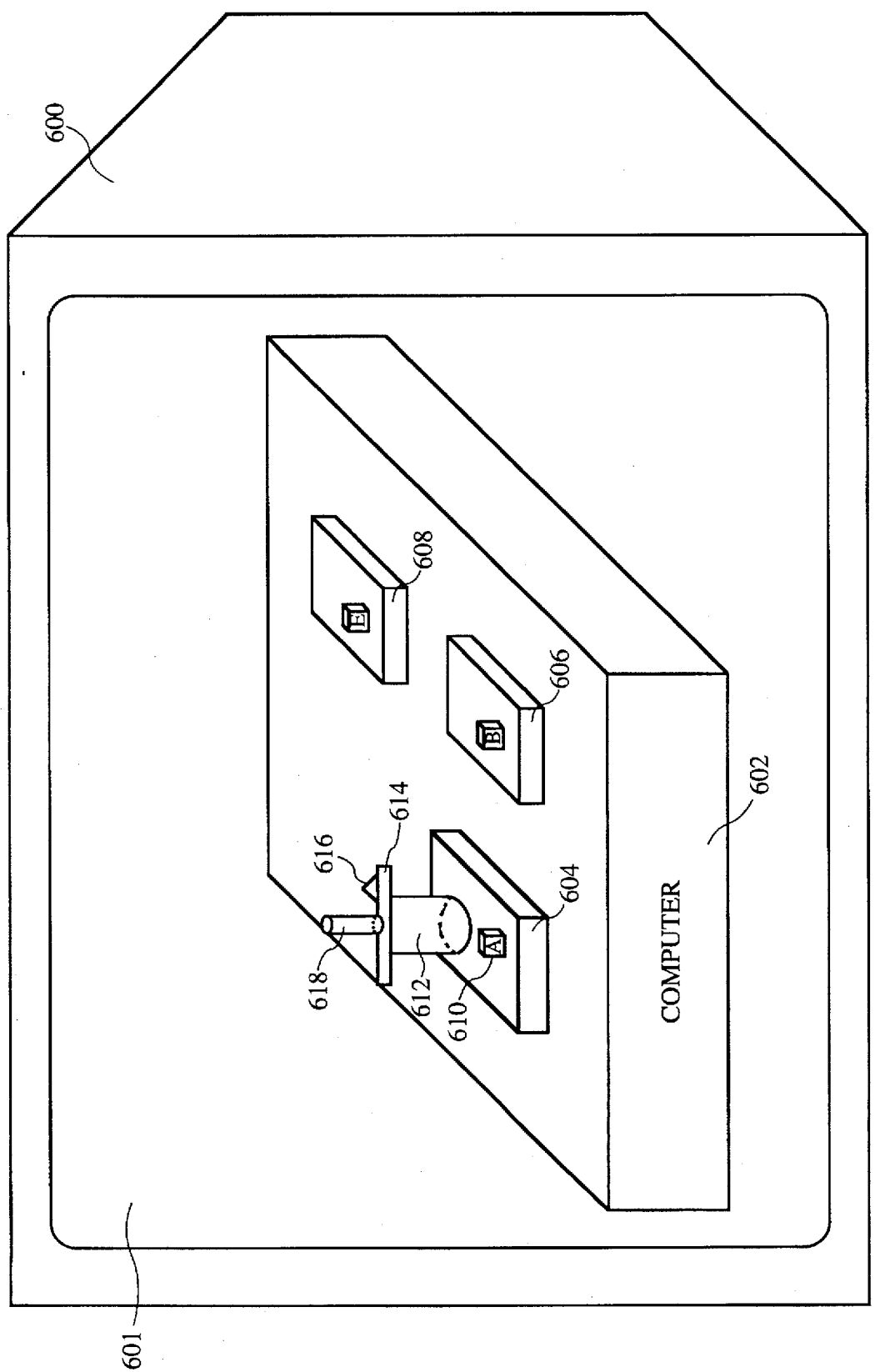
FIG. 8 is a view illustrating an example of a three-dimensional graphical image produced by an embodiment of the invention.

FIG. 8 is an illustration of a three-dimensional graphical image of computers, processes, and attributes of processes associated with a computer system being monitored. The three-dimensional graphical image is displayed on a display screen 600, or more accurately, on a screen 601 (or within a window) on the display screen 600. In the representative three-dimensional graphical image illustrated in FIG. 8, a computer 602 is shown by a three-dimensional rectangular box 602. Placed on the top surface of the rectangular box 602 are boxes 604, 606 and 608 which represent active processes on the computer. Preferably, in a DOE system the active processes are processes which are registered by the ORB. Such processes are known as registered server processes. When the ORB shuts down one of the registered server processes the corresponding rectangular box will be removed (i.e., no longer displayed). Likewise if another process is registered, another rectangular box will be displayed on the top surface of the rectangular box 602. Hence, the computers and processes in the representative illustration are represented by graphical objects which are three-dimensional boxes. However, it should be understood that other types of graphical objects could be used.

Each box 604, 606 and 608 has associated therewith an icon 610 which contains a legend, a pictorial or the like representing the process associated with the icon 610. For example, the box 604 has an icon 610 on the top thereof containing a letter "A" which is associated with the process represented by the box 604.

The attributes of the processes can also be represented by graphical objects. The following attributes are illustrated in the representative graphical image: process size, number of active objects, resident process size, running/idle and message transfer rate.

Process size is an attribute of as process that is useful to monitoring performance of processes. For example, in the case of the process represented by the rectangular box 604, the process size can be visually indicated to the user by varying the thickness of the rectangular box 604. For larger processes the height of the rectangular box 604 can be increased. On the other hand, for smaller processes, the height of the rectangular box 604 is decreased.

The number of active objects in a process is another attribute of a process that is useful to monitor. As an example, in FIG. 8, a vertical cylinder 612 placed on the top surface of the rectangular box 604 represents the number of active objects. The height of the vertical cylinder 612 represents the number of active objects in the process associated with the rectangular box 604. Preferably, the vertical cylinder 612 is also displayed in a color which differs from the color of the rectangular box 604.

A platform 614 may be provided on top of the vertical cylinder 612 as a decorative feature. Alternatively, the platform 614 could pertain to yet another attribute, namely the resident process size for the process associated with the rectangular box 604. In which case the thickness of the platform 614 could provide a visual indication of the resident process size.

Whether the process is currently running or idle is another attribute worth monitoring. In FIG. 8, a pyramid 616 is provided on top of the platform 6 14 and is displayed in a first color when the process is running and displayed in a second different color when the process is idle.

Still another useful attribute to monitor is message transfer rate. In FIG. 8, a pillar 618 extends vertically from the top surface of the platform 614 and the height of the pillar 618 represents the message transfer rate. Alternatively, the pillar 618 could be replaced by a cube which could change its rate of rotation and/or size in accordance with the message transfer rate. The cube could also be animated in other ways besides rotation.

Still yet another useful attribute to monitor is blockage. Blockage occurs when a process is stalled usually waiting to obtain a lock (e.g., mutex lock). Hence, with respect to FIG. 8, a stalled or blocked process could be visually indicated by displaying a blockage wall in front of the vertical cylinder 612. Further, the degree of blockage can be visually indicated by the level of translucence of the wall.

Appendix A contains an example of a model of graphical objects using RenderWare. For example, in Appendix A, the "#Server" refers to a model for a server process, the "#Base" refers to the rectangular box 602 representing the server process, the "#Icon" refers to the icon 610, the "#Wall" refers to the blockage wall, the "#Cylinder" refers to the vertical cylinder 612, the "#Run Light" refers to the pyramid 616, and the "#Traffic Indicator" refers to a cube which represents the message transfer rate (instead of the pillar 618).

The invention monitors and visually displays attributes of processes in a three-dimensional manner. By visualizing attributes of the processes developers and system administrators can identify usage and loads on various machines as well as identify where processes are being overloaded or blocked.

Using the invention, a system administrator can decide from a three-dimensional graphical image that message traffic between the two processes on two different computers would be better off if executed on the same computer because the graphical image visual indicates that a large amount of data traffic is occurring between the two processes. The attribute of the process most useful for this situation is message traffic between other processes and this process. To visually indicate such traffic to the user, the system can, for example, build three-dimensional pipes between the processes. Preferably, the pipes would be on the underside of the rectangular boxes for the processes much like plumbing pipes. In the case in which the processes are servers, when a server is moved for load balancing reasons, the clients of the server being moved must be informed that the move has taken place so that they can communicate with the server process on the new computer.

Also, the system administrator can decide to move a blocked process on a first computer to a second computer where it would not have to compete for the same resource (e.g., mutex lock) that caused it to be blocked on the first computer.

When the attribute data is requested by the visualizer process 126, through user input, the user can influence the scope or the extent to which attribute data is obtained. The advantage of focusing the attribute data on a particular computer or process or processes to the exclusion of others is that the rate at which the attribute data can be obtained is shortened. The shorter the time to obtain the attribute data, the faster the three-dimensional graphical image can be updated. The faster the three-dimensional graphical image is updated the closer it is to actual real time operation. As an example, the user can cause the visualizer process 126 to ask the global statistics server process 124 to obtain all attribute data from all the processes within the computer system. In this case, the user is indicating that he or she wishes all the attribute data available and is willing to wait until the attribute data is obtained. Alternatively, the user can cause the visualizer process 126 to request that the global statistics server process 124 obtain all the data it can in a fixed amount of time. In this case, the user is requesting all the data possible but is willing to wait only for that fixed amount of time (e.g., user might desire to wait only 0.5 seconds). Another option is that the user can cause the visualizer process 126 to request that the global statistics server process 124 obtain attribute data information from only certain computers. In this case, the user is able to focus the monitoring to certain computers where the user is interested in closely analyzing the performance of the processes active thereon.

By using a three-dimensional graphical image, a landscape view of the computer system can be displayed with numerous computers and numerous processes and their attributes being visually distinguishable. By using three-dimensions, not only are the graphical images more realistic looking, they also provide more space to provide visual information than would be otherwise representable with conventional two-dimensional approaches.

By using a three-dimensional graphical image to monitor a process of a computer, more attributes associated with the processes can be displayed to the user. In addition the display of these attributes can be displayed in a manner in which the user can understand the performance by a graphical change to a graphical object of the model associated with the process.

The graphical objects used with the three-dimensional image can take many forms and need not be as the examples illustrated in FIG. 8. It is, however, probably preferable to make the graphical objects related to one another in a manner which represents their actual physical relationship. For example, the graphical objects of all attributes should be coupled to the graphical object of the process to which they relate. Distinct graphical objects are also preferably consistently used such that they are easily visually recognized as the computer, process or attribute to which they correspond. Also, the characteristics of the graphical objects that are altered, changed or otherwise updated can vary widely, and typically will depend on the type of graphical object.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

APPENDIX A

```
# Server Visualization
ModelBegin
   LightSampling Facet
   GeometrySampling Solid
   Texture NULL
# Base    height = 0.2
ClumpBegin
   Tag 1
   Color 0.11 0.15 0.36
   Surface 0.32 0.36 0.48
   Translate 0.0 0.1 0.0      # self to Y = 0
   Block 2.0 0.2 2.0
   Translate 0.0 0.1 0.0      # stack child
# Icon width,height = 1.0 depth = 0.12
   ClumpBegin
      Tag 8
      Color 0.5 0.5 0.5
      Surface 0.32 0.36 0.48
      Translate -.95 0.01 0.88     # base front left corner
      TransformBegin
         Translate 0.375 0.375 0.05      # self to X=Y=Z=0
         Block 0.75 0.75 0.1
      TransformEnd
      Translate 0.00 0.00 0.11    # move to the front of previous block
      TransformBegin
         Translate 0.375 0.375 0.0       # self to X=Y=0
         Vertex -0.375 -0.375 0.0 UV 0.0 1.0
         Vertex  0.375 -0.375 0.0 UV 1.0 1.0
         Vertex  0.375  0.375 0.0 UV 1.0 0.0
         Vertex -0.375  0.375 0.0 UV 0.0 0.0
         Surface 0.5 0.5 0.0
         TextureModes Foreshorten Lit
         Texture item
         QuaExt 1 2 3 4 Tag 1
```

APPENDIX A-continued

```
   TransformEnd
   ClumpEnd     # Icon
# Wall height = 2.0
# Vary opacity between 0.0, 0.5 - values: 0.0, 0.14, 0.26, 0.5
ClumpBegin
   Tag 7
   Color 0.58 0.14 0.15
   Surface 0.64 0.42 0.53
   Opacity 0.0
   Translate 0.0 1.0 0.0     # self to Y = 0
   TransformBegin
      Translate -0.70 0.0 0.0
      Block 0.1 2.0 1.3
   TransformEnd
   TransformBegin
      Translate 0.70 0.0 0.0
      Block 0.1 2.0 1.3
   TransformEnd
   TransformBegin
         Translate 0.0 0.0 0.70
         Block 1.50 2.0 0.1
      TransformEnd
      TransformBegin
         Translate 0.0 0.0 -0.70
         Block 1.50 2.0 0.1
      TransformEnd
   ClumpEnd # Wall
# Lower Cap     height = 0.1
ClumpBegin
   Tag 2
   Color 0.5 0.5 0.5
   Surface 0.32 0.36 0.48
   Translate 0.0 0.05 0.0    # self to Y = 0
   Block 1.25 0.1 1.25
   Translate 0.0 0.05 0.0    # stack child
# Cylinder     height = 2.0
ClumpBegin
   Tag 3
   Color 0.56 0.71 0.39
   Surface 0.70 0.17 1.0
   Cylinder 2.0 0.45 0.45 8
   Translate 0.0 2.0 0.0     # stack child
# Upper Cap    height = 0.1
ClumpBegin
   Tag 4
   Color 0.5 0.5 0.5
   Surface 0.32 0.36 0.48
   Translate 0.0 0.05 0.0    # self to Y = 0
   Block 1.25 0.1 1.25
   Translate 0.0 0.05 0.0    # stack child
# Run Light
ClumpBegin
   Tag 5
   Color 0.30 0.65 0.20
   Surface 0.64 0.42 1.0
   Translate 0.3 0.0 0.3     # self to corner of upper cap
   Cone 0.1 0.1 8
ClumpEnd # Run Light
# Traffic Indicator
ClumpBegin
   Tag 6
   Color 0.04 0.84 0.66
   Surface 0.17 0.4 1.0
   Scale 0.5 0.5 0.5
   Translate 0.0 0.35 0.0    # self to Y = 0.2
   Rotate 1.0 0.0 0.0 45
   Rotate 0.0 0.0 1.0 45
   Block 0.3 0.3 0.3
ClumpEnd # Traffic Indicator
ClumpEnd # Upper Cap
ClumpEnd # Cylinder
ClumpEnd # Lower Cap
ClumpEnd # Base
ModelEnd
```

What is claimed is:

1. A performance monitoring system for various computer software processes associated with a computer network having at least a first and a second computer, each of the first and second computer capable of having numerous computer software processes concurrently active, said system comprising:

a first monitoring process, located on the first computer having a first set of processes, for monitoring attributes of the first set of processes;

a second monitoring process, located on the second computer having a second set of processes, for monitoring attributes of the second set of processes; and a visualizer process, capable of communicating with said first and second monitoring processes, for producing a three-dimensional graphical image including graphical objects representing the first and second sets of processes and the monitored attributes of the first and second sets of processes the three-dimensional graphical image being updated in substantially real-time to reflect changes in the attributes of the first and second sets of processes.

2. A system as recited in claim 1, wherein, for one or more of the graphical objects within the graphical image, at least one characteristic of the graphical object changes when the corresponding attribute being monitored changes.

3. A system as recited in claim 2, wherein the characteristics of the graphical objects that change are selected from one of the following: height, width, color, translucence, shape, rotation, texture, movement and sound.

4. A system as recited in claim 2, wherein the three-dimensional graphical image produced by said visualizer process comprises a visually distinct graphic object for one or more of the attributes being monitored.

5. A system as recited in claim 2, wherein the three-dimensional graphical image further includes graphical objects representing the first and second computers, and wherein the three-dimensional graphical image produced by said visualizer process comprises visually distinctive graphic shapes for processes and computers, so that a user viewing the graphical image can distinguish between the processes and the computers.

6. A system as recited in claim 2, wherein the three-dimensional graphical image produced by said visualizer process comprises visually distinct graphic shapes for one or more of the attributes being monitored.

7. A system as recited in claim 2, wherein the three-dimensional graphical image produced by said visualizer process comprises visually distinct colors for one or more of the attributes being monitored on a particular computer.

8. A system as recited in claim 2, wherein the three-dimensional graphical image produced by said visualizer process further uses animation to indicate a characteristic of one or more of the attributes.

9. A system as recited in claim 2, wherein the three-dimensional graphical image produced by said visualizer process further uses sound to indicate a state of one or more processes or a characteristic of one or more of the attributes.

10. A system as recited in claim 2, wherein the three-dimensional graphical image is displayed on a display screen of a computer system.

11. A computer-implemented method for visualizing performance of software processes of a computer system, said method comprising:

(a) providing a three-dimensional graphical model of the computer system having graphical objects for each of the software processes of the computer system that are to be monitored;

(b) displaying the three-dimensional graphical model on a display screen;

(c) monitoring attributes of the software processes that are being monitored; and (d) updating the three-dimensional graphical model on the display screen by altering characteristics of the graphical objects in accordance with the attributes monitored, said updating occurs at a rate such that a user viewing the display screen is given the impression that the three-dimensional graphical model being displayed is updated in nearly real time with respect to changes in the performance of the software processes being monitored.

12. A method as recited in claim 11, wherein said method further comprises:

(e) repeating (c) and (d).

13. A method as recited in claim 11, wherein said updating (d) comprises:

(d1) determining whether the attributes monitored have changed;

(d2) when said determining (d1) determines that the attributes monitored have changed, altering the characteristics of the graphical objects in accordance with the attributes monitored; and (d3) when the graphical objects have been altered (d2), updating the three-dimensional graphical model being displayed in the display screen by redisplaying at least the graphical objects that have been altered.

14. A method as recited in claim 13, wherein the characteristics of one of the graphical objects being altered is one of the following: height, width, color, translucence, shape, rotation, texture, movement and sound.

15. A method as recited in claim 14, wherein the characteristics of one of the graphical objects being altered is a combination of two or more of the following: height, width, color, translucence, shape, rotation, texture, movement and sound.

16. A method as recited in claim 11, wherein the three-dimensional graphical model visually indicates the performance of the software processes being monitored in nearly real time.

17. A method as recited in claim 11, wherein the graphical model further includes a graphical object for visually indicating a stall or block condition of a process.

18. A computer-implemented method for monitoring computer software processes within a computer system, the computer system includes a plurality of computers, with at least one of the computers having a display screen and an input device, said method comprising:

(a) providing graphical objects for the computer software processes and attributes of the computer software processes that are being monitored;

(b) obtaining data corresponding to the attributes of the computer software processes that are being monitored;

(c) updating the graphical objects in accordance with the data obtained in (b);

(d) visually displaying on the display screen the updated graphical objects as a three-dimensional graphical image of the computer software processes and the attributes thereof that are being monitored; and (e) enabling a user to interact with the three-dimensional graphical image, via the input device, to select a first computer process of the computer software processes being monitored and then move the first computer process from a first computer to a second computer, where the first and second computers are within the computer system.

19. A method as recited in claim 18, wherein said enabling (e) comprises:

(e1) selecting the first computer process using from the graphical object being displayed on the display screen corresponding thereto; and (e2) dragging the graphical object selected to the graphical object corresponding to the second computer.

20. A method as recited in claim 18, wherein said method further comprises:

(f) repeating (b) through (d).

21. A method as recited in claim 18, wherein one or more of the graphical objects are three-dimensional graphical objects.

22. A method as recited in claim 18, wherein said updating (c) and said displaying (d) together operate such that the computer software processes and the attributes thereof being monitored can be visually monitored in nearly real time.

23. A method as recited in claim 18, wherein said updating (c) updates characteristics of the graphical objects, said characteristics being selected from the group of: height, width, color, translucence, shape, rotation, texture, movement and sound.

24. A method as recited in claim 18, wherein said providing (a) further provides a graphical object to visually indicate a stall or block condition of a computer process.

25. A computer program product, comprising:

a computer usable medium having computer readable code embodied therein for monitoring computer software processes within a computer system, and wherein said computer readable code includes at least first computer readable program code devices configured to cause a computer to effect providing graphical objects for the computer software processes and attributes of the computer software processes that are being monitored;

second computer readable program code devices configured to cause a computer to effect obtaining data corresponding to the attributes of the computer software processes that are being monitored;

third computer readable program code devices configured to cause a computer to effect updating the graphical objects in accordance with the data obtained, the graphical objects being updated in substantially real-time to reflect changes in the attributes of the computer software processes being monitored; and fourth computer readable program code devices configured to cause a computer to effect visually displaying the updated graphical objects as a three-dimensional graphical image of the computer software processes and the attributes thereof that are being monitored.

26. A computer program product as recited in claim 25, wherein said computer readable code further includes fifth computer readable program code devices configured to cause a computer to effect enabling a user to interact with the three-dimensional graphical image, via an input device, to select a first computer process of the computer software processes being monitored and then move the first computer process from a first computer to a second computer.

27. A computer program product as recited in claim 25, wherein said fifth computer readable program devices comprises:

program code devices for selecting the first computer process using from the graphical object being displayed on the display screen corresponding thereto; and program code devices for dragging the graphical object selected to the graphical object corresponding to the second computer.

28. A computer program product as recited in claim 25, wherein third computer readable program code devices comprises:

first program code devices for determining whether the attributes monitored have changed;

second program code devices for altering the characteristics of the graphical objects in accordance with the attributes monitored when said first program code devices determine that the attributes monitored have changed; and third program code devices for redisplaying at least the graphical objects that have been altered when the graphical objects have been altered by said second program code devices.

29. A computer program product as recited in claim 28, wherein the characteristics of one of the graphical objects being altered by said second program code devices is one of the following: height, width, color, translucence, shape, rotation, texture, movement and sound.

30. A computer program product as recked in claim 28, wherein the characteristics of one of the graphical objects being altered by said second program code devices is a combination of two or more of the following: height, width, color, translucence, shape, rotation, texture, movement and sound.

31. A computer program product as recited in claim 25, wherein third computer readable program code devices comprises:

program code devices for providing a graphical object for visually indicating a stall or block condition of a computer software process being monitored.

* * * * *

UNITED STATES PATENT AND TRADEMARK OFFICE
CERTIFICATE OF CORRECTION

PATENT NO. : 5,720,018
DATED : February 17, 1998
INVENTOR(S) : Muller et al.

It is certified that error appears in the above-identified patent and that said Letters Patent is hereby corrected as shown below:

IN THE CLAIMS:

Column 14, line 15, "processes" should be --processes,--.

Column 18, line 4, "recked" should be --recited--.

Signed and Sealed this

Twenty-ninth Day of June, 1999

*Attest:*

Q. TODD DICKINSON

*Attesting Officer*     *Acting Commissioner of Patents and Trademarks*